United States Patent [19]
Blood

[11] Patent Number: 5,600,330
[45] Date of Patent: Feb. 4, 1997

[54] DEVICE FOR MEASURING POSITION AND ORIENTATION USING NON-DIPOLE MAGNETIC FIELDS

[75] Inventor: Ernest B. Blood, Burlington, Vt.

[73] Assignee: Ascension Technology Corporation, Burlington, Vt.

[21] Appl. No.: 273,965

[22] Filed: Jul. 12, 1994

[51] Int. Cl.$^6$ ............................... G01B 3/02; G01B 5/04; G01B 7/14

[52] U.S. Cl. .................. 342/463; 342/448; 342/451; 364/559; 324/207.15

[58] Field of Search ............................... 342/448, 450, 342/451, 463, 464; 364/559; 324/260, 207.15, 207.116, 207.17; 345/8, 158

[56] References Cited

U.S. PATENT DOCUMENTS

| | | |
|---|---|---|
| 3,868,565 | 2/1975 | Kuipers. |
| 4,054,881 | 10/1977 | Raab. |
| 4,287,809 | 9/1981 | Egli et al.. |
| 4,314,251 | 2/1982 | Raab. |
| 4,737,794 | 4/1988 | Jones. |
| 4,742,356 | 5/1988 | Kuipers. |
| 4,807,202 | 2/1989 | Cherri et al. ............................. 367/129 |
| 4,829,250 | 5/1989 | Rotier ..................................... 324/225 |
| 4,849,692 | 7/1989 | Blood. |
| 4,945,305 | 7/1990 | Blood. |
| 5,105,548 | 4/1992 | Fowler ..................................... 33/356 |
| 5,172,056 | 12/1992 | Voisin. |
| 5,214,615 | 5/1993 | Bauer ..................................... 367/128 |
| 5,307,072 | 4/1994 | Jones, Jr.. |
| 5,347,289 | 9/1994 | Elhardt .................................. 342/448 |

OTHER PUBLICATIONS

Charles P. Comeau and James S. Bryan, Headsight Television System Provides Remote Surveillance, Nov. 10, 1961.

*Primary Examiner*—Gregory C. Issing
*Attorney, Agent, or Firm*—Davis and Bujold

[57] ABSTRACT

Position and orientation of receiving antennae with respect to magnetic field transmitting antennae are determined. The transmitter consists of two or more antenna whose dimensions are large compared to the distance to the receiver. The receiver consists of two or more antenna that are sensitive to the type of signal transmitted. A computer is used to control the transmitting and receiving elements and to convert the received signals into position and orientation.

15 Claims, 4 Drawing Sheets

DEVICE FOR MEASURING POSITION AND ORIENTATION USING NON-DIPOLE MAGNETIC FIELDS

BACKGROUND OF THE INVENTION

1. Field Of The Invention

This invention pertains to devices using magnetic fields for measuring the position and orientation of receiving antennae with respect to transmitting antennae.

2. Description Of The Prior Art

The concept of using transmitting and receiving antennae with electromagnetic coupling for measuring position and/or orientation is well know for military target sighting applications. In this application a gunner is seated in the cockpit of an aircraft and the receiving antennae are located on his helmet. Transmitter antennae are located a few inches away usually on the plastic canopy directly behind his head. As the gunner sights a target through a sighting crosshair affixed to his helmet, the receiving antennae pick up signals generated by the transmitting antennae. These signals are processed by a computer to determine the location and orientation of the helmet and then to point the armament in the same direction as the helmet mounted sight.

Prior art magnetic field position and orientation measuring systems are typified by the following referenced patents U.S. Pat. Nos. 3,868,565 (Kuipers), 4,054881 (Raab), 4,287,809 (Eglie et al), 4,849,692 and 4,945,305 (Blood). These systems utilize dipole transmitting antennae which generate either AC or DC magnetic fields that are measured by receiving antennae located on the user. The received signals are converted into position and orientation using mathematics that describes the transmitted dipole fields. These systems have the following characteristics in common:

1. The equations used to determine position and orientation are based on the signals being generated by dipole transmitting antennae.

2. The transmitter consists of two or three individual dipole antennae that are collocated about a common center and whose axes are ideally orthogonal to each other.

3. The characteristics of the transmitted field are such that the signal strength falls off rapidly by one over the cube of the distance to the receiver.

4. The receiver operates outside the transmitter coils at some distance, it does not operate within or between the transmitter coils.

5. If there are electrically conductive metals (such as aluminum) near the transmitter then the time varying components of the transmitted fields will induce eddy currents in these metals which will in turn generate a magnetic field which will distort the transmitted field. As the receiver to transmitter separation increases the resultant errors in the computed position and orientation of the receiver increases. This eddy current generation is an acute problem for systems that utilize AC transmitted signals while systems that use a pulsed DC transmitted signal are not as sensitive.

6. If there are magnetically permeable metals (such as carbon steel) near the transmitter then the magnetic flux generated by the transmitter will be distorted by this permeable material. For a given steel structure surrounding the transmitter and receiver, the resulting errors in position and orientation will increase as the distance between the transmitter and receiver increases. The magnitude of this permeable material error is similar for both AC and DC systems.

For a transmitting loop antenna to generate true dipole fields at a given location, the antenna must be either infinitesimally small or infinitely far from the field measurement location. If true dipole field conditions do not prevail then the computed position and orientation will be in error. To make the fields more dipole like, Voisin in U.S. Pat. No. 5,172,056 utilizes a unique transmitter and receiver antenna coil winding geometry while Jones in U.S. Pat. No. 4,737,794 discloses a mathematical method to make the field from a circular loop transmitter look like a dipole when the receiver is at distances greater than the radius of the transmitter coils.

Large area antenna have been disclosed in a paper titled "Headsight Television System Provides Remote Surveillance" by Charles P. Comeau and James S. Bryan in Electronics, Nov. 10, 1961. This system requires six antenna to generate a uniform field over the central part of a room where it is desired to measure head orientation.

In a newer application of the technology in the field of computer animation it is desired to animate computer generated images of cartoon characters, robots, or animals. To accomplish this, one or more actors with several receivers attached to their arms, legs, and torso perform the desired sequence of movements in a room equipped with the transmitter. The receiver's position and orientation measurements are captured by the animation computer and used to make the computer generated image follow the actors's motions.

FIG. 1 shows the use of prior art trackers in this application. Typically, one or more actors 1 are located in a room with walls, floor, and ceiling 2. The room contains two or three transmitting dipole antenna 3 centered about a common origin. The antenna is mounted on some type of support structure 4 in the area where the actor will be moving. On the actor are one or more receiving antenna 5 used to measure his body motion. The transmitter and receiver antennae are connected to an electronics box 6 via wire cables 7 where the signals are transformed into receiver position and orientation for use by the computer animation system.

These prior art systems suffer from the following problems:

1. The strength of the transmitted dipole field drops off as $1/R^3$, where R represents the distance from the transmitter to the receiver. Because of this rapid drop off in signal, the distance that the actor can move about the transmitter antennae is limited. To overcome this limitation several transmitters must be used to provide the desired coverage or a lot of power must be used to overcome the $1/R^3$ drop in signal.

2. As the actor moves farther from the transmitter, the position and orientation measurements exhibit increased errors due to the conductive and permeable metals used in the construction of the building thereby limiting the area over which the actors can move.

An object of this invention is to provide for the first time an electromagnetic position and orientation measuring system that can provide a large operational volume without the need for multiple transmitters or a high power transmitter.

It is also an object of this invention to provide a measurement system that can provide a large operational volume inside a metal building with smaller measurement errors than prior art systems resulting from the interaction of the metal with the signal.

It is further an object of this invention to provide a transmitting antenna configuration and signal processing method that can be adapted to many different antenna mounting environments by eliminating the prior art requirements of concentric, near-orthogonal, and dipole like transmitting antenna.

SUMMARY OF THE INVENTION

The device of the present invention is comprised of an electromagnetic transmitting antennae driven by either DC or AC signals, receiving antennae sensitive to the format of the transmitted signal, and processing means to determine position and orientation from the resultant non-dipole fields. The transmitting antennae is composed of two or three coils forming an antennae structure whose dimensions are large compared to the separation distance between the transmitter and receivers.

It has been discovered that if receiver antennae are used inside a volume of space where non-dipole field conditions exist instead of outside that space, as is required by dipole transmitting antenna, then the signal strength does not fall off rapidly with $1/R^3$, as does a dipole, but falls off, as slowly as approximately $1/R$, thereby greatly reducing the power requirements to cover a given area. Further it has been noted that measurements inside the antenna structure have smaller errors due to large conductive and permeable metal than prior art dipole systems. This new antennae structure consists of two or three loop antenna of any shape with a size on the order of the area to be covered.

Prior art systems based on dipole transmitting antennae, as shown in FIG. 2, require the transmitter axes 10, 11, 12 to be centric to each other, that is the antennae must share a common origin 13. The antenna configuration of the present invention eliminates the concentric requirement thereby facilitating very flexible configurations depending on the measuring application.

Prior art antenna systems also require the transmitter antennae to be orthogonal or near orthogonal to each other so that the resultant signals can be corrected to appear to have come from orthogonal dipole antennae. In the instant invention this requirement is eliminated, in fact they can be at any angle to each other as shown in FIG. 4 or even parallel to each other as shown in FIG. 5. In these figures each antenna axis is show as a square or rectangle, in fact each antenna axis can have any shape, for example, a triangle.

Comeau and Bryan's large area antennae disclosure describes a system that requires six antenna to generate a uniform field over the central part of a room where it is desired to measure head orientation. This differs from the instant invention which uses only two or three antenna to measure not only orientation but also position throughout the entire coil system, not just in a central uniform field region. Since the cited prior art is using the six coils as a large Helmholtz system, the coils must be centric and orthogonal to each other to generate three orthogonal uniform fields over the central part of the room. The instant invention has no such restrictions and purposely generates non-uniform fields over the entire working volume to enable position to be calculated which cannot be done in the cited Helmholtz field system.

According to the present invention there is provided a device for determining the position and orientation of receiving antenna with respect to transmitting antenna using electromagnetic fields comprising transmitting means for transmitting electromagnetic fields; and receiving means for receiving said electromagnetic fields, wherein said receiving means is disposed inside a volume of space where non-dipole field conditions exist.

Also according to the present invention there is provided a method for determining the position and orientation of receiving antenna with respect to transmitting antenna using electromagnetic fields comprising the steps of transmitting electromagnetic fields to a receiving means; and positioning said receiving means inside a volume of space where non-dipole field conditions exist.

Also according to the present invention there is provided a method for determining the position and orientation of receiving antenna with respect to transmitting antenna using electromagnetic fields comprising the steps of transmitting electromagnetic fields to a receiving means; positioning said receiving means inside a volume of space where non-dipole field conditions exist, wherein computing the position of the receiving antenna comprises the steps of initializing the geometry of the transmitting antennae by defining the x, y, z coordinates of the ends of each antenna segment; measuring the induction field components from the transmitting antennae; computing the magnitudes of the measured induction vectors of said induction field components and the angles between the measured induction vectors given by the dot products of the vectors; representing the magnitudes and angles as a linear extrapolation from a computed value by using a first order Taylor expansion about the computed value; computing the partial derivatives of the Taylor expansion, and solving for dX, dY and dZ; and iterating the values of dX, dY and dZ until the values are sufficiently small to give an accurate indication of the coordinates of the receiver in the x, y, z coordinate plane defined by the transmitting antennae.

A BRIEF DESCRIPTION OF THE DRAWINGS

The invention will now be described, by way of example, with reference to the accompanying drawings, in which.

A DETAILED DESCRIPTION OF THE PREFERRED EMBODIMENTS

Figure 1:
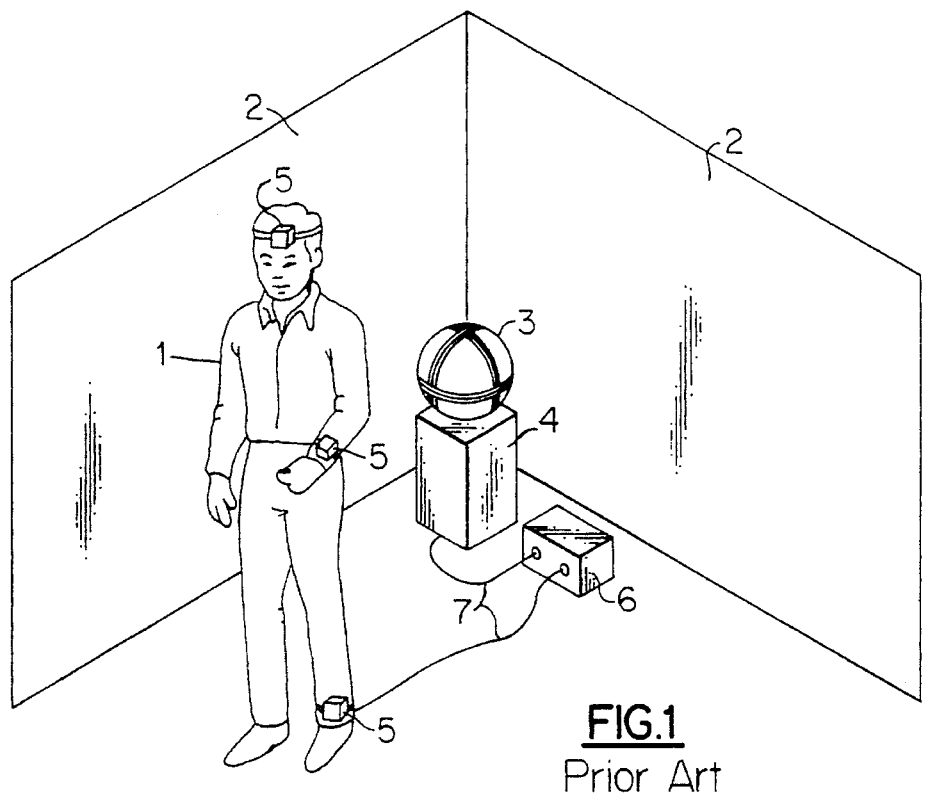
FIG. 1 shows the arrangement of components of a prior art system used for tracking movement of a person.
Figure 3:
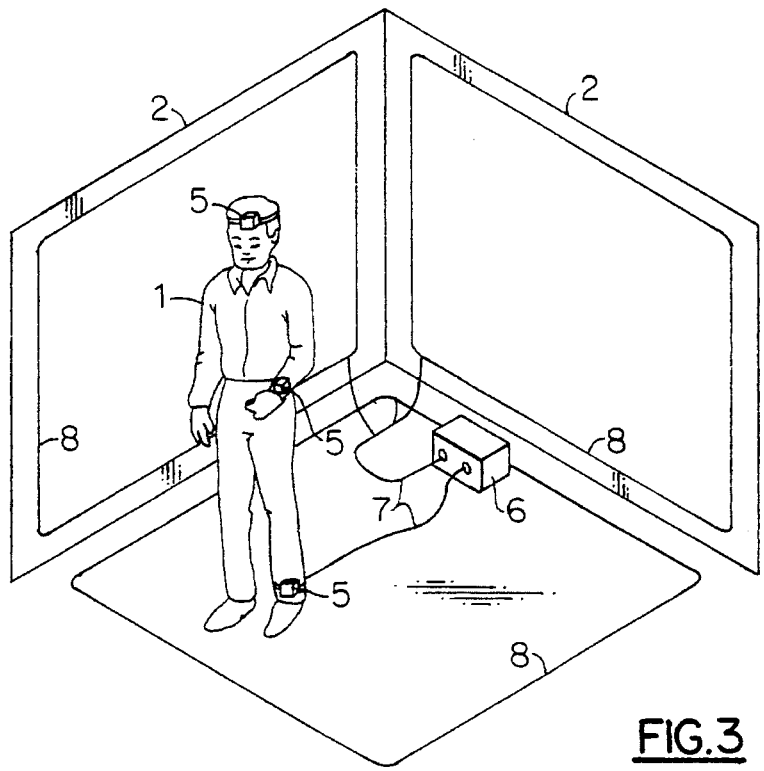
FIG. 3 shows an arrangement of components using the instant invention for tracking movement of a person.
Figure 2:
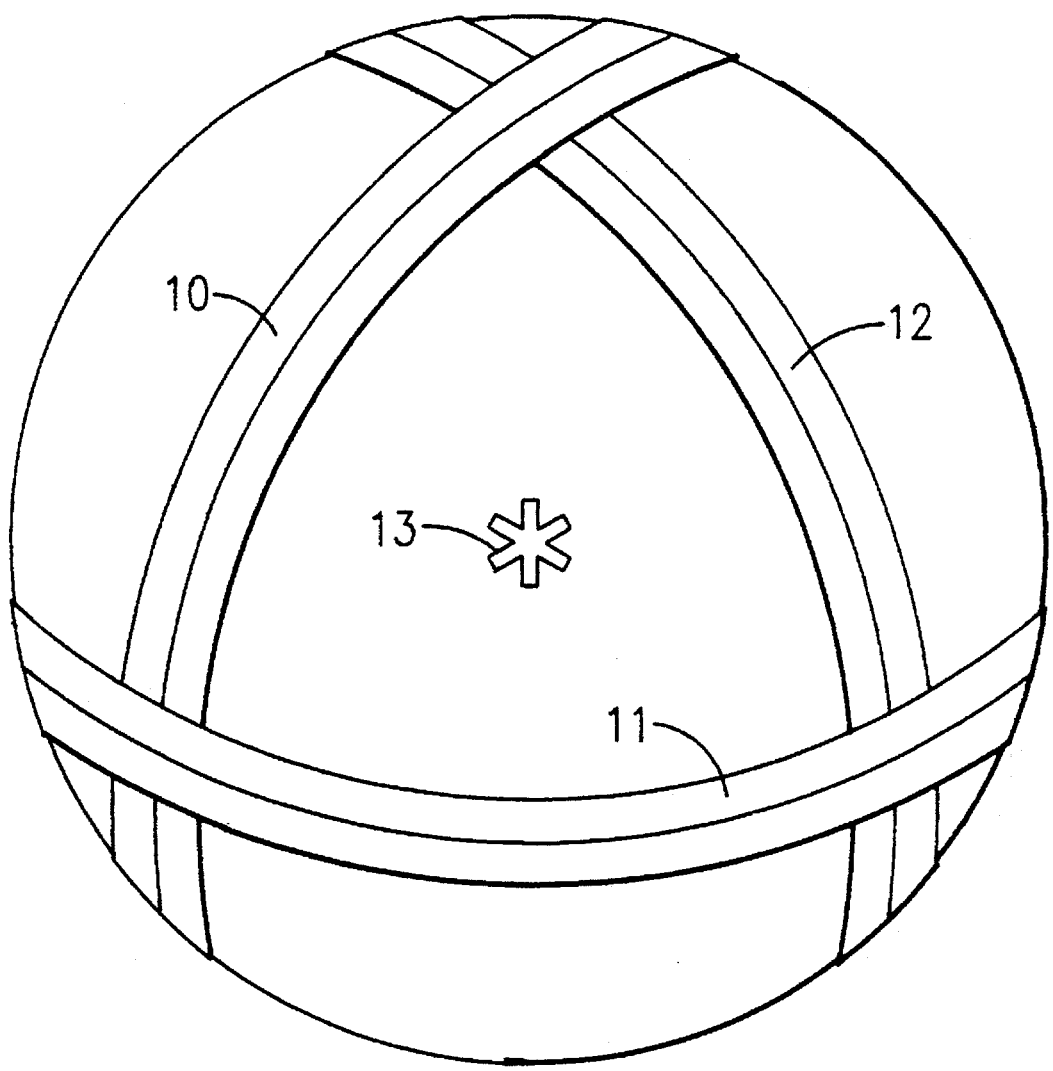
FIG. 2 shows a prior art transmitting antenna with three concentric and orthogonal circular antenna loops.
Figure 4:
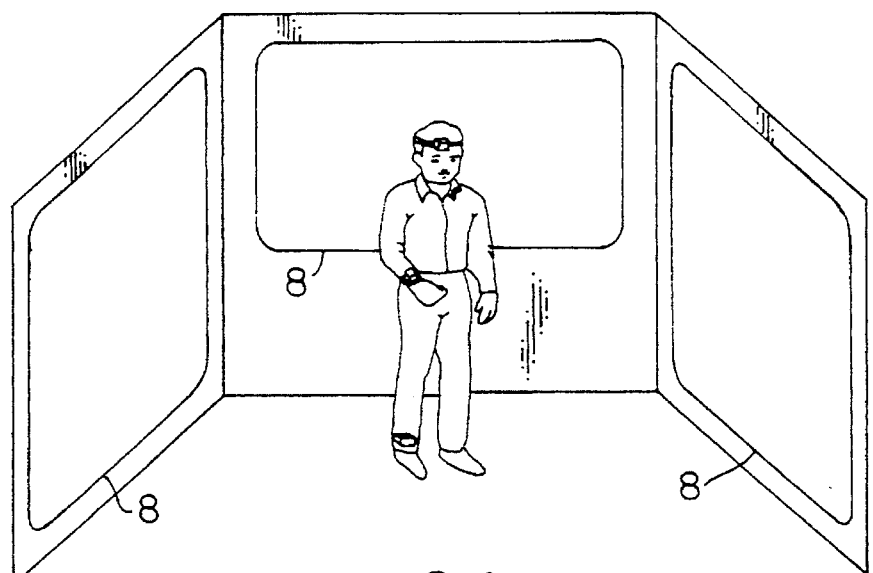
FIG. 4 shows an arrangement of the three instant invention transmitter antenna loops that are not concentric or orthogonal.
Figure 5:
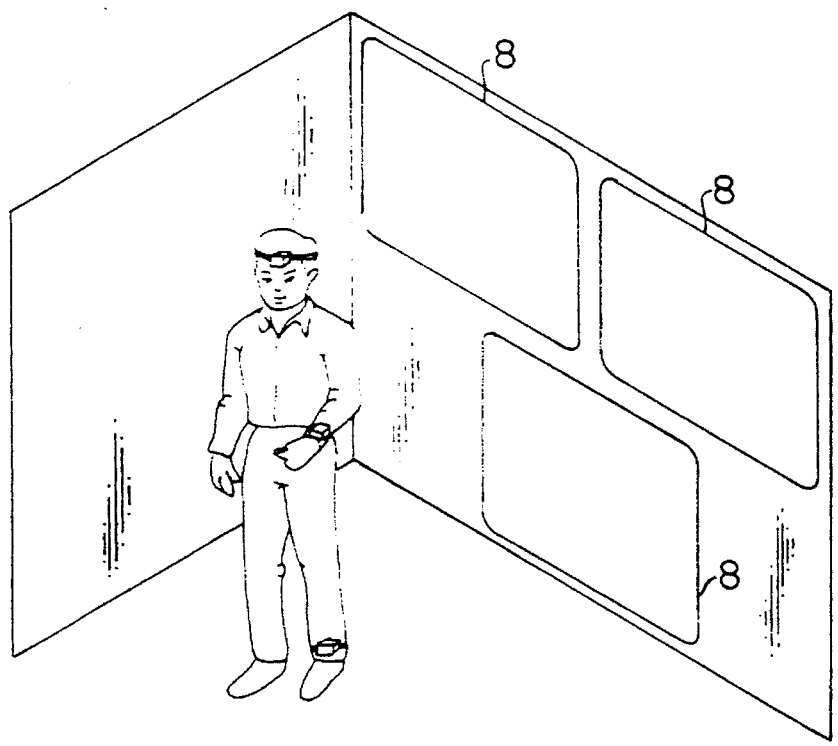
FIG. 5 shows an arrangement of the instant invention transmitter antenna loops that are co-planar to each other and not concentric.

The computer animation application using the new antenna concept is shown in FIG. 3. Here the actor 1 is standing in a room with walls, floor and ceiling 2. Attached to two of the walls and the floor or ceiling are three non-dipole antenna 8. The antennae are scaled in size to cover the area required for the actor's movements and are simply a single wire loop hung from the surfaces. On the actor are one or more receivers 5 used to measure the actor's body motion. The receivers 5 are spaced from the antennae 8 by a distance less than the smaller of the effective radii of the antennae. The effective radius is the radius defined by the mean distance from the antenna axis to its border. Preferably, the receivers 5 are disposed inside a volume of space where non-dipole field conditions exist. The transmitter and receiver signals are interconnected to an electronics box 6 via wire cables 7 where the signals are transformed into receiver position and orientation for use by the computer animation system.

Figure 6:
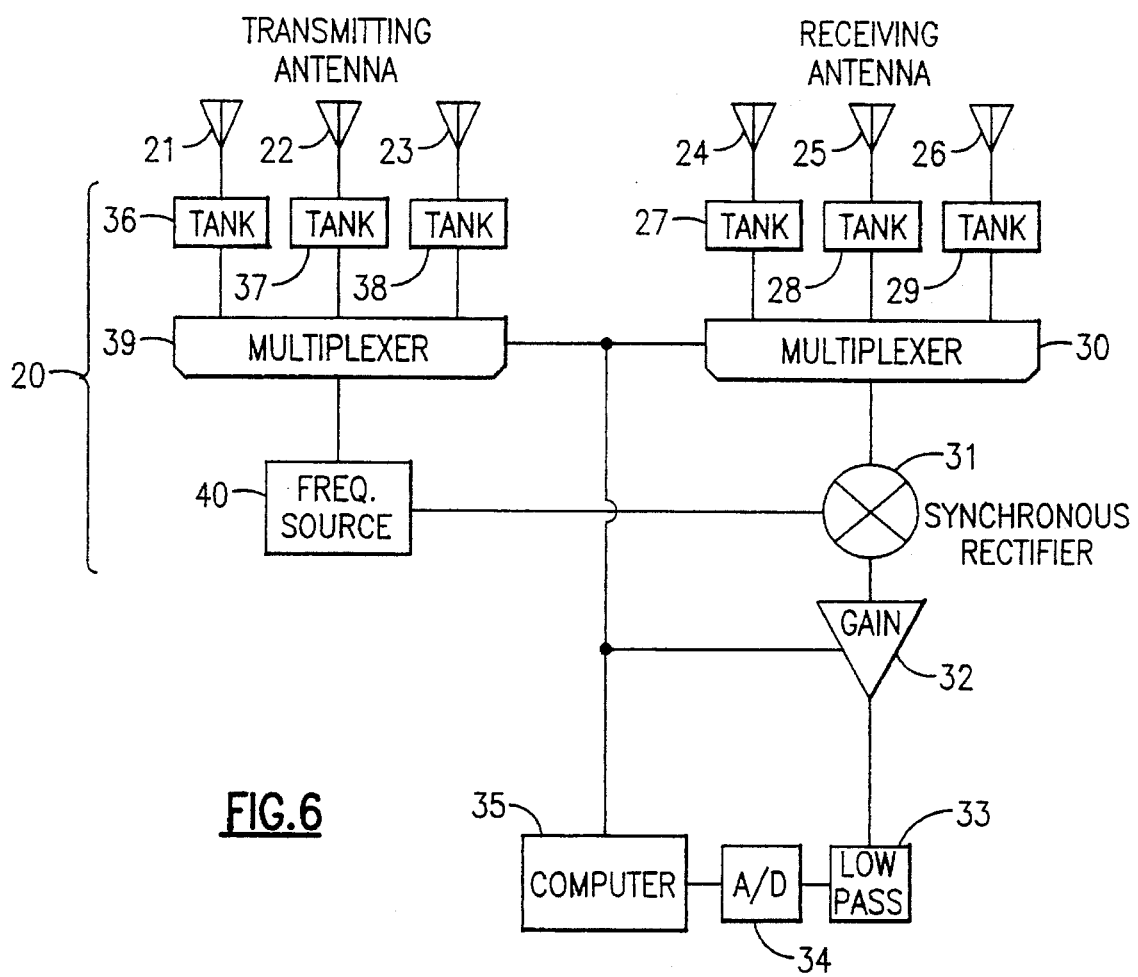
FIG. 6 shows a system block diagram of the instant invention.

FIG. 6 depicts the major elements of the disclosed invention. Details of the electrical design of these elements is not presented since they are well known to those skilled in the art. The embodiment discussed uses a transmitted signal consisting of a time division multiplexed AC carrier of any convenient frequency as long as the wavelength is much greater than the distance measured. Other transmitted signal formats such as frequency or phase division multiplexing or even pulsed DC could also be used. In operation the transmitter circuits 20 provide a desired AC current to each transmitter antenna 8 here shown as 21, 22, 23 one at a time. The transmitted signals are detected by the receiver antenna 24, 25, 26 where the signals are resonated 27, 28, 29, multiplexed 30, rectified 31, amplified 32, filtered 33, converted to digital format 34 and read into a computer 35 for conversion to position and orientation. The amplitude of the received signals being a measure of the receiver's position and orientation.

The transmitter circuits 20 are designed as a resonant tank circuit to efficiently deliver AC current to the transmitter antenna 21, 22, 23. For this application in computer animation where the actor 1 will have many receivers 5 on his body and one wants to quickly measure the outputs from all receivers at the same time, it is desirable that the transmitter power not be adjusted up or down as a given receiver moves farther away or closer to a given antenna, hence this embodiment has a constant current drive source. Switches 39 are activated by the computer 35 one at a time to provide current to each antenna 21, 22, 23 one at a time.

The three transmitter antenna 21, 22, 23 each consist simply of a piece of wire of the length required to encircle the volume of space where the actor will be moving. The ends of each antenna being attached to the corresponding transmitter circuits 20. For example, if the actor is in an eight foot high room and he wants to move about an eight by eight foot floor space using the antenna configuration depicted in FIG. 3 then each of the three antenna loops would consist of a piece of, say, AWG#18 magnet wire thirty two feet long. In this application the antenna loops would simply be hung on the room walls or suspended from the ceiling. Precision in maintaining the straightness or rectangular shape of the loops is not required since the transmitted field measured at a given point in the room is an integration of all the fields from the entire length of the coil.

The receiver antenna 24, 25, 26 consists of three non-parallel loop antennae which have currents induced into their coils by the transmitted field based on the principle of electromotive induction. In this example embodiment each coil could have a diameter of 11 mm (0.4") and consist of 100 turns of AWG#36 magnetic wire.

The receiving coils are each tuned to resonance in tank circuits 27, 28, 29 to provide for efficient transfer of energy from the coils 24, 25, 26 to the rest of the receiver circuit elements. The resonating circuits 27, 28, 29 could consist simply of a capacitor resonating with the coil and a damping resistor.

The computer 35 controls a 3 to 1 multiplexer 30 which selects the signals from one receiver antenna at a time to be rectified by rectifier 31 which converts the AC signal measured by the receiver into a bipolar DC signal. In this case the rectifier uses the transmitter's frequency reference 40 as a control signal to ensure that phase reversals in the received signal are preserved. The rectified signal is then amplified by amplifier 32 to maintain the receiver signal within a usable range of, say, ±5 volts. The amount of amplification is selected by the computer 35.

The amplified and rectified signal is then passed through a low pass filter 33 resulting in a DC value representative of the amplitude of the voltage induced in the receiver coil.

This signal is then converted to digital format by the analog to digital converter 34 and read into the computer 35 for conversion to position and orientation using the following algorithm.

ALGORITHM TO CONVERT NON-DIPOLE SIGNALS INTO POSITION AND ORIENTATION.

Receiver position is determined by using an iterative linear approximation algorithm that utilizes the measured magnetic induction vectors. Receiver orientation is then determined using an exact non-iterative algorithm which utilizes the measured induction vectors and the computed induction vectors. An algorithm that iteratively determines both position and orientation could have also been used but is not the preferred embodiment because there are fewer numerical problems associated with having to determine only three unknowns instead of six unknowns iteratively. To measure both three-dimensional position and orientation the number of receiving antenna i times the number of transmitting antenna j must equal at least six with the requirement that i and j must be at least two.

POSITION DETERMINATION

To determine the three unknown receiver position coordinates x, y, z one must measure at least three characteristics of the transmitted field and know the mathematical relationship between these characteristics and the receiver's position. The field characteristics could be the magnitudes of the measured induction vectors or a measure of the angles between the measured vectors such as the dot products or a combination of at least three of the above. Using any three of the items results in a system of three non-linear equations with three unknowns. In the preferred embodiment, six measurements (three magnitudes and three dot products) are combined in a least squares manner to utilize the redundant measurements to solve for the three position unknowns. The magnitudes of the vectors are used because they are independent of receiver orientation. The angles between the vectors are used to differentiate between other locations in the fields that may have the same vector magnitudes to ensure that no position ambiguities result.

Figure 7:
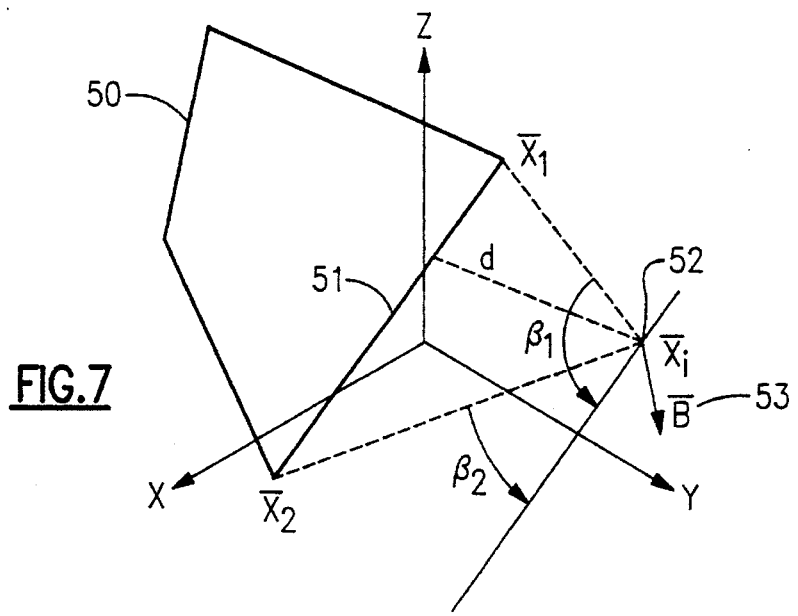
FIG. 7 shows the geometry used for computing the magnetic induction vector.

Because the preferred embodiment uses transmitting antenna of any shape, location and orientation with respect to each another and because the receiver is operating very close to the transmitting antenna, in fact, it may be completely enclosed by multiple transmitter antenna, one must account for the geometry of the transmitting antenna when establishing the mathematical relationship between the measured induction vectors and the receiver's position. This relationship can be established by applying Ampere's law to the transmitting antenna to determine the induction field at any receiver position. FIG. 7 shows a single transmitting antenna 50 of arbitrary shape, location and orientation with respect to the receiver's position 52. The antenna 50 is represented by an N sided polygon where N=4 in this illustrative example. The induction field B at any location 52 resulting from antenna segment 51 is by Ampere's law:

$$\bar{B} = \frac{\mu_o * I}{4*\pi*d} * (\cos\beta_2 - \cos\beta_1) * \bar{e}_s \quad [1]$$

Where I is the current flowing in the antenna in a counter-clockwise direction and d is the perpendicular distance from the antenna segment to the user's location 52. d is determined from the following cross product:

$$d = \|(\bar{X}_t - \bar{X}_1) \times \bar{e}_s\|$$

Where the notation $\bar{X}_i$ represents the x, y, z positional vector from the origin to location i and $\bar{e}_s$ represents a unit vector in the direction of a given antenna segment and is given by:

$$\bar{e}_s = \frac{\bar{X}_2 - \bar{X}_1}{\|\bar{X}_2 - \bar{X}_1\|}$$

and where the cosines of the angles are given by the following dot products:

$$\cos\beta_1 = \frac{\bar{e}_s \cdot (\bar{X}_1 - \bar{X}_t)}{\|\bar{X}_1 - \bar{X}_t\|}$$

$$\cos\beta_2 = \frac{\bar{e}_s \cdot (\bar{X}_2 - \bar{X}_t)}{\|\bar{X}_2 - \bar{X}_t\|}$$

The direction of the induction vector B at the receiver's location follows from the right hand screw rule. A unit vector in the direction of this induction vector is given by the following cross product:

$$\bar{e}_B = (\bar{X}_2 - \bar{X}X_1) \times (\bar{X}_t - \bar{X}_1)$$

The total induction field B at location 52 is the vector sum of the B's from each segment of all transmitter antenna.

The algorithm to compute the x, y, z coordinates of a given receiver consists of the following steps:

Step 1. Initialization of the geometry of the transmitting antenna. The geometry is described by the x, y, z coordinates of the ends of each antenna segment.

Step 2. Measure the induction field components, $B_m$ from the three transmitting antenna:

$$B_m = \begin{vmatrix} B(1,1) & B(1,2) & B(1,3) \\ B(2,1) & B(2,2) & B(2,3) \\ B(3,1) & B(3,2) & B(3,3) \end{vmatrix} = |\bar{B}_1 \bar{B}_2 \bar{B}_3| \quad [2]$$

Where the notation $B_{ij}$ means the induction vector component measured by receiver antenna i that was generated by transmitter antenna j. If a two antenna receiver were being used then the components B(i,3) would be computed from the cross product of $\bar{B}_1$ and $\bar{B}_2$.

STEP 3. Compute the magnitudes of the measured induction vectors $MBi_m$ and a measure of the angles between the measured vectors, the dot products, $Di_m$ using:

$$MB1_m = \|\bar{B1}\|$$

$$MB2_m = \|\bar{B2}\| \quad [3]$$

$$MB3_m = \|\bar{B3}\|$$

$$D1_m = \bar{B1} \cdot \bar{B2}$$

$$D2_m = \bar{B1} \cdot \bar{B3} \quad [4]$$

$$D3_m = \bar{B2} \cdot \bar{B2}$$

STEP 4. Represent the measured field values as a linear extrapolation from a computed value by using a first order Taylor expansion about the computed value, yielding six equations in three unknowns dX, dY, dZ defined by:

$$MB1_m = MB1_c + \frac{\partial MB1}{\partial X} dX + \frac{\partial MB1}{\partial Y} dY + \frac{\partial MB1}{\partial Z} dZ$$

$$MB2_m = MB2_c + \frac{\partial MB2}{\partial X} dX + \frac{\partial MB2}{\partial Y} dY + \frac{\partial MB2}{\partial Z} dZ$$

$$MB3_m = MB3_c + \frac{\partial MB3}{\partial X} dX + \frac{\partial MB3}{\partial Y} dY + \frac{\partial MB3}{\partial Z} dZ$$

$$D1_m = D1_c + \frac{\partial D1}{\partial X} dX + \frac{\partial D1}{\partial Y} dY + \frac{\partial D1}{\partial Z} dZ$$

$$D2_m = D2_c + \frac{\partial D2}{\partial X} dX + \frac{\partial D2}{\partial Y} dY + \frac{\partial D2}{\partial Z} dZ$$

$$D3_m = D3_c + \frac{\partial D3}{\partial X} dX + \frac{\partial D3}{\partial Y} dY + \frac{\partial D3}{\partial Z} dZ$$

Where the computed values (c subscript) are determined by applying the currently computed receiver coordinates to equation 1 to determine a computed induction vector and then determining the computed magnitudes and computed dot products from equations 3 and 4.

STEP 5. Compute the partial derivatives defined above, either analytically or by the simpler method of taking a small step in each of the x, y and z directions and finding the change in the function due to this step. For example:

$$\frac{\partial MB1}{\partial X} = \frac{MB1(X + \Delta X, Y, Z) - MB1(X, Y, Z)}{\Delta X}$$

STEP 6. Solve for dX, dY, dZ in the equations defined in STEP 4 using any of the standard numerical methods used for solving an over determined set of linear equations.

STEP 7. Update the estimated location of the receiver using:

$$\bar{X}_{i+1} = \bar{X}_i + \bar{dX}$$

STEP 8. If the dX, dY, dZ values are large, continue to iterate.

The algorithm to compute the orientation of the receiver consists of the following steps:

STEP 1. Compute the induction vectors measured by a zero orientation receiver in the x, y, z coordinate frame of the transmitter using equation 1 at the currently computed position of the receiver. Arrange these values into a matrix $B_t$:

$$B_t = \begin{vmatrix} B_t(1,1) & B_t(1,2) & B_t(1,3) \\ B_t(2,1) & B_t(2,2) & B_t(2,3) \\ B_t(3,1) & B_t(3,2) & B_t(3,3) \end{vmatrix}$$

STEP 2. The relationship between the induction values measured by a receiver at some orientation and the induction values measured in the frame of the transmitter is:

$$B_m = A * B_t$$

Where all items represent 3×3 matrices The matrix (A) is the standard directional cosine matrix representation of orientation.

Using the expression above, orientation is then computed from:

$$A = B_m * B_t^{-1}$$

What is claimed is:

1. A device for determining position and orientation of a receiving antenna with respect to a transmitting antenna using a plurality of electromagnetic fields, said device comprising:

transmitting means for transmitting a plurality of non-rotating electromagnetic fields, each from a different location where said transmitting means comprises more than one non-dipole antennae;

means for supplying a current to said transmitting means for creating said transmitted electromagnetic fields;

receiving means disposed to receive said electromagnetic fields, wherein said receiving means is disposed inside a volume of space where non-dipole field conditions exist; and processing means for measuring and converting output signals from said receiving means into position and orientation measurements.

2. The device according to claim 1, wherein said locations are orthogonal.

3. The device according to claim 1, wherein said locations are non-orthogonal.

4. The device according to claim 1, wherein said locations are co-planar.

5. The device according to claim 1, wherein said receiving means comprises more than one non-parallel loop antennae.

6. The device according to claim 1, wherein said transmitting means comprises a formed elongate electrical conductor patterned in a desired shape defining an antenna axis and an effective radius, and said effective radius is further defined by the mean distance from said antenna axis to a border of said shape; and said receiving means is spaced from said transmitting means by a distance less than said effective radius, whereby said receiving means is located in a volume of space where non-dipole field conditions exist.

7. The device according to claim 6, wherein said transmitting means comprises three elongate electrical conductors, each of said elongate electrical conductor defining an antenna axis and an effective radius, where said receiving means is spaced from said transmitting means by a distance less than the smaller of said effective radii.

8. The device according to claim 1, wherein said transmitting means comprises means for sequentially activating said antennae.

9. The device according to claim 8, wherein said means for sequentially activating said three transmitting antenna comprises one of a time division multiplexed AC signal whose wavelength is substantially greater than the distance between said transmitting means and said receiving means, a phase division multiplexed signal, a frequency division multiplexed signal, and a pulsed DC signal.

10. A device for determining position and orientation of a receiving antenna with respect to a transmitting antenna using a plurality of electromagnetic fields, said device comprising:

transmitting means comprising three transmitting antennae for transmitting a plurality of electromagnetic fields, and said three transmitting antennae being disposed such that said three transmitting antennae bound a volume of space in which non-dipole electromagnetic fields exist;

receiving means disposed inside said volume of space to receive said electromagnetic fields where each said transmitting antenna consists of a formed elongate electrical conductor patterned in a desired shape bounding a portion of said volume of space;

each of said transmitting antennae has an effective radius defined by the mean distance from an axis of said transmitting antenna to its corresponding border, and said receiving means being spaced from said transmitting means by a distance less than the smaller of said effective radii; and processing means for measuring and converting output signal from said receiving means into position and orientation measurements.

11. The device according to claim 10, wherein said transmitting means comprises means for sequentially activating said antennae.

12. The device according to claim 11, wherein said means for sequentially activating said three transmitting antenna comprises one of a time division multiplexed AC signal whose wavelength is substantially greater than the distance between said transmitting means and said receiving means, a phase division multiplexed signal, a frequency division multiplexed signal, and a pulsed DC signal.

13. A method for determining position and orientation of a receiving antenna with respect to a non-rotating, non-dipole transmitting antenna using a plurality of electromagnetic fields, said method comprising the steps of:

transmitting said electromagnetic fields to receiving means;

positioning said receiving means inside a volume of space where non-dipole field conditions exist;

processing and converting output signals, received from said receiving means, into position and orientation measurements by:

a) defining a geometry of a transmitting antenna by measuring x, y, z coordinates of ends of each of a plurality of discrete segments of said transmitting antenna;

b) measuring more than one induction field components generated in said receiving means by said transmitting antenna;

c) computing a magnitude of measured induction vectors of said measured induction field components;

d) determining a plurality of angles between said measured induction vectors by computing dot products of said measured induction vectors;

e) representing said computed magnitudes and said angles as a linear extrapolation by using a first order Taylor expansion yielding six equations with three unknowns (dX, dY, and dZ);

f) computing partial derivatives (dX, dY and dZ) defined by said six equations;

g) determining change in position values (dX, dY and dZ) using an iterative approximation; and h) iterating said change in position values (dX, dY and dZ) until said change in position values are sufficiently small to give an accurate indication of the coordinates of said receiving means in the x, y, z coordinate plane defined by said transmitting antenna.

14. The method according to claim 13, wherein the processing and converting step further comprises computing said measured induction vectors, measured by a zero orientation receiver in the x, y, z coordinate plane defined by said transmitting antenna, at a currently computed position of said receiving antenna, and determining said orientation by multiplying said measured induction vectors measured by said receiving antenna by a matrix inverse of said measured induction field components.

15. A device for determining position and orientation of a receiving antenna with respect to a transmitting antenna using a plurality of electromagnetic fields, said device comprising:

transmitting means comprising three transmitting antennae for transmitting a plurality of said electromagnetic fields, and said transmitting antenna being disposed such that said three transmitting antennae bound a volume of space in which a plurality of non-dipole electromagnetic fields exist wherein said three antennas are arranged non-orthogonally;

receiving means being disposed inside said volume of space to receive said plurality of electromagnetic fields; and processing means for measuring and converting output signals from said receiving means into position and orientation measurements.

* * * * *